US012101506B2

(12) United States Patent
Fleureau et al.

(10) Patent No.: US 12,101,506 B2
(45) Date of Patent: Sep. 24, 2024

(54) PROCESSING VOLUMETRIC DATA

(71) Applicant: InterDigital CE Patent Holdings, SAS, Paris (FR)

(72) Inventors: Julien Fleureau, Rennes (FR); Franck Thudor, Rennes (FR); Gerard Briand, Ploufragan (FR); Renaud Dore, Rennes (FR)

(73) Assignee: InterDigital CE Patent Holdings, SAS, Wilmington, DE (US)

( * ) Notice: Subject to any disclaimer, the term of this patent is extended or adjusted under 35 U.S.C. 154(b) by 218 days.

(21) Appl. No.: 17/622,278

(22) PCT Filed: Jun. 23, 2020

(86) PCT No.: PCT/EP2020/067520
§ 371 (c)(1),
(2) Date: Dec. 23, 2021

(87) PCT Pub. No.: WO2021/001217
PCT Pub. Date: Jan. 7, 2021

(65) Prior Publication Data
US 2022/0264150 A1  Aug. 18, 2022

(30) Foreign Application Priority Data
Jul. 4, 2019  (EP) .................................... 19305912

(51) Int. Cl.
*H04N 19/597* (2014.01)
*H04N 19/70* (2014.01)
(52) U.S. Cl.
CPC ........... *H04N 19/597* (2014.11); *H04N 19/70* (2014.11)

(58) Field of Classification Search
CPC .............................. H04N 19/597; H04N 19/70
(Continued)

(56) References Cited

U.S. PATENT DOCUMENTS

| 10,334,260 B2 | 6/2019 | Hannuksela | |
| 2013/0111538 A1* | 5/2013 | Endo ...................... | H04N 21/45 725/116 |

(Continued)

FOREIGN PATENT DOCUMENTS

| CN | 106464893 A | 2/2017 |
| CN | 109391815 A | 2/2019 |

(Continued)

OTHER PUBLICATIONS

Salahieh et al., "Test Model for Immersive Video", International Organisation for Standardisation, ISO/IEC JTC 1/SC 29/WG 11, Coding of Moving Pictures and Audio, Document: N18470, Geneva, Switzerland, Mar. 2019, 27 pages.

(Continued)

*Primary Examiner* — Behrooz M Senfi
(74) *Attorney, Agent, or Firm* — Condo Roccia Koptiw LLP

(57) ABSTRACT

At least one embodiment relates to a method and apparatus for encoding a volumetric video representing a scene, said encoding being based on patches representing the color and depth of a 2D projection of subparts of the scene, wherein a first patch is packed in a second patch for a given time interval lower than or equal to a time period along which the second patch is defined when said first patch can be packed in said second patch over said time interval. Decoding method and apparatus are also provided.

14 Claims, 11 Drawing Sheets

(58) Field of Classification Search
USPC .................................................... 375/240.12
See application file for complete search history.

(56) References Cited

U.S. PATENT DOCUMENTS

2017/0214943 A1* 7/2017 Cohen ................... H04N 19/62
2019/0045213 A1 2/2019 Raut et al.

FOREIGN PATENT DOCUMENTS

| EP | 3 429 210 A1 | 1/2019 | |
| WO | WO-2019016158 A1 * | 1/2019 | ............. G06T 15/20 |
| WO | 2019/055389 A1 | 3/2019 | |

OTHER PUBLICATIONS

Dore, Renaud, "Description of Immersive Video Core Experiments 3", International Organisation for Standardisation, ISO/IEC JTC 1/SC 29/WG 11, Coding of Moving Pictures and Audio, Document: MPEG2019/N18467, Geneva, Switzerland, Mar. 2019, 4 pages.

Fleureau et al., "Description of Technicolor Intel response to MPEG-I 3DoF+ Call for Proposal", International Organisation for Standardisation, ISO/IEC JTC1/SC29/WG11, Coding of Moving Pictures and Audio, Document: MPEG2019/m47445, Geneva, Switzerland, Mar. 2019, 24 pages.

Kim et al., "[MPEG-I Visual] CE3-Related: Invalid Region Padding for Atlas Construction", International Organisation for Standardisation, ISO/IEC JTC1/SC29/WG11, Coding of Moving Pictures and Audio, Document: MPEG2019/m49056, Gothenburg, Sweden, Jul. 2019, 4 pages.

Boyce et al., "Working Draft 1 of Metadata for Immersive Media (Video)", ISO/IEC JTC1/SC29/WG11 MPEG2018/M18464, Geneva, China, Apr. 2019, 33 pages.

* cited by examiner

| atlas_params( a ) { | Descriptor |
|---|---|
|    num_patches_minus1[ a ] | u(16) |
|    for ( i = 0; i <= num_patches_minus1; i++ ) { | |
|       view_id[ a ][ i ] | u(8) |
|       patch_width_in_view[ a ][ i ] | u(16) |
|       patch_height_in_view[ a ][ i ] | u(16) |
|       patch_pos_in_atlas_x[ a ][ i ] | u(16) |
|       patch_pos_in_atlas_y[ a ][ i ] | u(16) |
|       patch_pos_in_view_x[ a ][ i ] | u(16) |
|       patch_pos_in_view_y[ a ][ i ] | u(16) |
|       patch_rotation[ a ][ i ] | u(8) |
|       patch-lifetime[a][i] | u(4) |
|    } | |
| } | |

Fig. 5

PROCESSING VOLUMETRIC DATA

CROSS REFERENCE TO RELATED APPLICATIONS

This application is a U.S. National Stage Application under 35 U.S.C. 371 of International Patent Application No. PCT/EP2020/067520, filed Jun. 23, 2020, which is incorporated herein by reference in its entirety.

This application claims the benefit of European Patent Application No. 19305912, filed Jul. 4, 2019, which is incorporated herein by reference in its entirety.

TECHNICAL FIELD

At least one of the present embodiments relates generally to encoding/decoding volumetric video

BACKGROUND

The present section is intended to introduce the reader to various aspects of art, which may be related to various aspects of at least one of the present embodiments that is described and/or claimed below. This discussion is believed to be helpful in providing the reader with background information to facilitate a better understanding of the various aspects of at least one embodiment.

With the recent emergence of consumer Head Mounted Displays (Oculus, HTC Vive, etc.) associated with improved screen resolution, field of view as well as frame rate, Virtual Reality is literally booming. Such a phenomenon especially opens the door to new kind of applications in numerous domains including gaming, education/training as well as multimedia. In this latter domain, new kind of video contents have especially appeared including the so-called 360° videos. Such videos allow the user to watch all around himself through pure rotations around a fixed point of view.

Even if pure rotations are sufficient for a first omnidirectional video experience, they may quickly become frustrating for the viewer who would expect more freedom. More importantly, it could also induce dizziness as head rotations include small translations of the head which are not reproduced by such experiences.

An alternative to these 360° contents is known as volumetric or 6 Degrees Of Freedom (6DoF) video. When watching such videos, in addition to rotations, the user can also translate his head inside the watched content and experience parallax. Such videos considerably increase the feeling of immersion and the perception of the scene depth but also prevent from dizziness by providing consistent visual feedback during head translations. The associated content is basically created by the means of dedicated sensors allowing the simultaneous recording of color and depth of the scene of interest. The use of rig of color cameras combined with photogrammetry techniques is a common way to do this recording. While 360° videos simply come down to a temporal succession of particular images resulting from the unmapping of spherical textures (latlong/equirectangular images for instance), 6DoF video "frames" are more complex as they should embed the information from several point of views. They can be viewed as a temporal series of colored point clouds resulting from the 3D capture described before.

Two different kinds of volumetric videos may be considered depending on the viewing conditions. The more permissive one allows a complete free navigation inside the video content whereas a second one (that we consider here) restricts the user viewing space to a limited volume. This latter context is a natural compromise between free navigation and passive viewing conditions of an audience member seated in his armchair. It is moreover conceivable in a shorter term than the free viewpoint scenario, it requires less effort to acquire content (due to the restriction of the visualization box) and it is currently considered in standardization organizations under the name of 3DoF+ within the standard MPEG-I Part 7/Metadata For Immersive Video (MIV) (ISO/IEC JTC 1/SC29/WG11 working draft 1 of metadata for Immersive Media (Video) N18464 and W18470).

3DoF+ contents (volumetric video) are often provided as a set of Multi-View+ Depth (MVD) frames over a time period, that is as a set of MVD frames. At a time instant of the time period, a MVD frame represents the color and depth of the volumetric video as multiple couples of views. Each couple of views comprises a view for color and one view for depth. Volumetric video may come from real captures or can be generated from existing Computer Graphics contents by the mean of dedicated (possibly photorealistic) rendering.

Recently, a video-based framework has been proposed to encode/decode a volumetric video.

Roughly speaking, the volumetric video is conveyed as couples of color and depth patches packed in color and depth atlases which are then encoded making use of regular video codecs (typically HEVC). Each couple of color and depth patches represents a 2D (typically spherical) projection of a subpart of the scene over the time period, that is captures the color and depth of a subpart of a couple of views over the time period, and the set of all couples of color and depth patches is designed at the encoding stage to represent the 2D projection of the whole scene while being as less redundant as possible. In other words, a volumetric video is defined as a set of views (color+depth) captured by a set of cameras (real cameras for natural contents or virtual cameras for computer generated contents) and representing a scene. These views are generally redundant. Patches are sub-parts of the views sufficient for representing completely the scene, the sub-parts being little or not redundant.

Encoding color and depth atlases using video-based coder takes advantage of making use of color and depth patches with static location within the frame to code per time periods. This makes the video encoding temporal prediction really easier and efficient.

Thus, each couple of color and depth patches should have static properties over a given time period, typically a multiple of a MVD frame duration. The patches are said defined (valid) over said time period. As for the content of a color or depth patch of a couple of color and depth patches, it may temporally vary over said time period.

At the decoding stage, the color and depth atlases are first decoded using video-based decoder (typically HEVC) and the color and depth patches are un-projected in a view synthesis process to recover the viewport associated to a desired viewing position. In addition to the color and depth atlases, specific metadata describing a patch arrangement are signaled along with the color and depth atlases for a proper decoding. In particular, said metadata may list the set of 2D/spherical projections (also named cameras) used for the color and depth atlas creation as well as the patch properties (position, size, . . . ).

SUMMARY

The following presents a simplified summary of at least one of the present embodiments in order to provide a basic understanding of some aspects of the present disclosure. This summary is not an extensive overview of an embodiment. It is not intended to identify key or critical elements of an embodiment. The following summary merely presents some aspects of at least one of the present embodiments in a simplified form as a prelude to the more detailed description provided elsewhere in the document.

According to a general aspect of at least one embodiment, there is provided a method for encoding a volumetric video representing a scene, said encoding being based on patches representing the color and depth of a 2D projection of subparts of the scene, wherein a first patch is packed in a second patch for a given time interval lower than or equal to a time period along which the second patch is defined when said first patch can be packed in said second patch over said time interval.

In one embodiment, the method further comprises transmitting an information defining said time interval.

According to another general aspect of at least one embodiment, there is provided a method for decoding a volumetric video representing a scene, said decoding being based on patches representing the color and depth of a 2D projection of subparts of the scene, wherein when a first patch is packed in a second patch for a given time interval lower than or equal to a time period along which the second patch is defined, the method comprises unpacking said first patch from said second patch over said time interval.

In one embodiment, the first patch is said packed in the second patch over said time interval when an information defining said time interval is received.

According to a general aspect of at least one embodiment, there is provided an apparatus comprising means for encoding a volumetric video representing a scene, said encoding being based on patches representing the color and depth of a 2D projection of subparts of the scene, wherein a first patch is packed in a second patch for a given time interval lower than or equal to a time period along which the second patch is defined when said first patch can be packed in said second patch over said time interval.

In one embodiment, the apparatus further comprises means for transmitting an information defining said time interval.

According to a general aspect of at least one embodiment, there is provided an apparatus comprising means for decoding a volumetric video representing a scene, said decoding being based on patches representing the color and depth of a 2D projection of subparts of the scene, wherein when a first patch is packed in a second patch for a given time interval lower than or equal to a time period along which the second patch is defined, the method comprises unpacking said first patch from said second patch over said time interval.

In one embodiment, the first patch is said packed in the second patch over said time interval when an information defining said time interval is received.

According to a general aspect of at least one embodiment, there is provided a bitstream comprising a volumetric video representing a scene, said volumetric video being encoded using an encoding based on patches representing the color and depth of a 2D projection of subparts of the scene, wherein the bitstream further comprises an information defining a time interval indicating that a first patch is packed in a second patch over said time interval.

In one embodiment, said signaled information indicates a first and a second indices of an ordered list of patches.

In one embodiment, the time period being split into multiple time intervals, said information defining said time interval is a bit indicating one of said time intervals.

One or more of at least one of embodiment also provide a computer program product and a non-transitory computer readable medium.

The specific nature of at least one of the present embodiments as well as other objects, advantages, features and uses of said at least one of the present embodiments will become evident from the following description of examples taken in conjunction with the accompanying drawings.

BRIEF DESCRIPTION OF DRAWINGS

In the drawings, examples of several embodiments are illustrated. The drawings show:

FIG. 5 illustrates an example of a syntax element in accordance with at least one embodiment.

DETAILED DESCRIPTION

At least one of the present embodiments is described more fully hereinafter with reference to the accompanying figures, in which examples of at least one of the present embodiments are shown. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of this application.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Similar or same elements of figures are referenced with the same reference numbers.

Some figures represent syntax tables widely used in standard specification for defining the structure of a bitstream that conforms with those standard specification. In those syntax tables, the term ' . . . ' denotes unchanged portions of the syntax with respect to the original definition given in V-PCC and removed in the figures to facilitate reading. Bold terms in figures indicate that a value for this term is obtained by parsing a bitstream. The right column of the syntax tables indicates the number of bits for encoding a data of a syntax element. For example, u(4) indicates that 4 bits are used for encoding a data, u(8) indicates 8 bits, ae(v) indicates a context adaptive arithmetic entropy coded syntax element.

The aspects described and contemplated below may be implemented in many different forms. FIGS. 1-6 below provide some embodiments, but other embodiments are contemplated and the discussion of FIGS. 1-6 does not limit the breadth of the implementations.

At least one of the aspects generally relates to volumetric video encoding and decoding, and at least one other aspect generally relates to transmitting a bitstream generated or encoded.

Moreover, the present aspects are not limited to MPEG standards such as MPEG-I part 7 and may be applied, for example, to other standards and recommendations, whether pre-existing or future-developed, and extensions of any such standards and recommendations. Unless indicated otherwise, or technically precluded, the aspects described in this application may be used individually or in combination.

The cornerstone of the altas-based volumetric video encoding/decoding is naturally the way the color and depth patches of the color and depth atlases are created to be sufficiently non-redundant and complementary.

Figure 1:
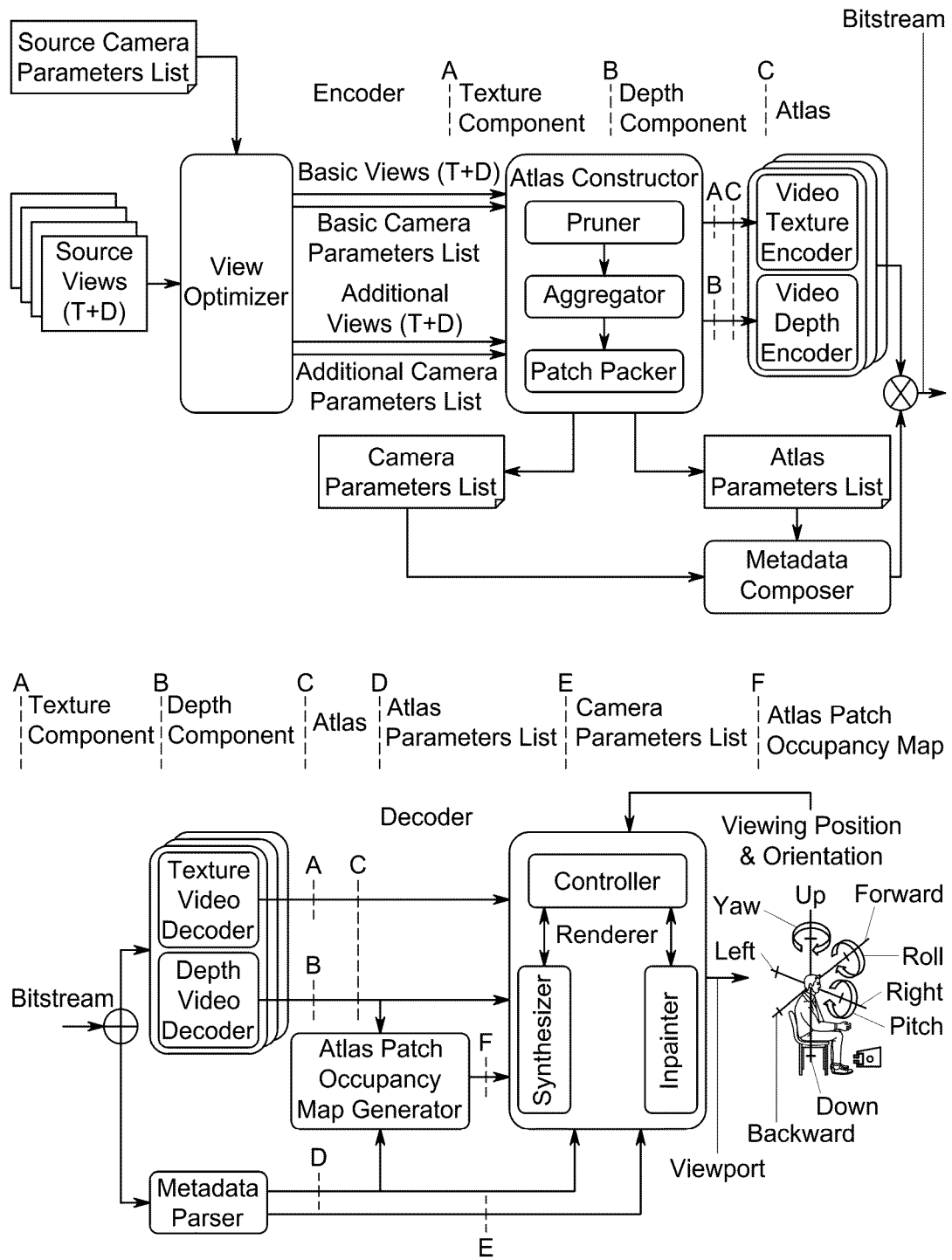
FIG. 1 illustrates a schematic block diagram of an example of an altas-based volumetric video encoding/decoding in accordance with prior art.

FIG. 1 illustrates a schematic block diagram of an example of an altas-based volumetric video encoding/decoding in accordance with prior art (MIV).

In essence, the altas-based volumetric video encoder comprises a view optimizer, an atlas constructor, a video encoder and a metadata composer. Similarly, the altas-based volumetric video decoder comprises a video decoder, a metadata parser, an atlas patch occupancy map generator, and a renderer.

The view optimizer split the couple of views associated with MVD frames over a given time period T into so-called "basic" couples of views and "additional" couples of views.

Possibly, synthetic views are created as either view of a "basic" or "additional" couple of views. Synthetic views are not in the initial input set of views to be encoded.

The "basic" couples of views are intended to be fully conveyed in so-called "big" patches (one couple of color and depth patches per "basic" couple of views) whereas the "additional" couples of views are intended to be "pruned", that is only some subparts of the color and depth of these "additional" couples of views may be encoded and conveyed in associated couples of color and depth patches as described below.

The atlas constructor builds color and depth patch atlases representing the volumetric video.

First, for each MVD frame, the associated "additional" couples of views are iteratively pruned one after the other: Each part of the scene which is already contained in the "basic" couples of views or in any previously pruned "additional" couples of views is discarded. A binary mask is then built up for every pruned "additional" couples of views of every MDV frame of the time period T.

Next, the binary masks associated with a pruned "additional" couple of views over the time period T are merged into one unique aggregated binary mask which then contains a valid value at a given spatial position (indicating that some color and depth of a "additional" couple of views have to be conveyed by color and depth patches) if one of the binary masks it comes from has a valid value at this spatial position.

Next, the aggregated binary mask, associated with each "additional" couples of views, is clustered. A cluster is a rectangular area grouping connected pixels of the aggregated binary mask, having valid values. Each of these clusters represent a region of one "additional" couple of views that should be conveyed in a couple of color and depth patches for the time period T.

Then, for each "additional" couples of views, at least one couple of color and depth patches is obtained by packing clusters together in the color and depth atlases (large frames) making use of dedicated algorithms ("MaxRect" for instance). Some clusters may be split and/or rotated if necessary to fit the packing bins. Empty areas of some patches may be also used to pack clusters of another "additional" couples of views (so-called "spatial" patch in patch) to save space. As mentioned before, the "basic" couples of views also give rise to "big" patches which are also packed in color and depth atlases following the same procedure. Note that the packing procedure only consists in finding patch properties (position, size, . . . ) and not in effectively producing the color and depth atlases.

Finally, once the patch list has been shaped, for each MVD frame over the time period T, the corresponding color and depth atlases are generated. More precisely, the color and depth parts of the "basic" and "additional" couples of views corresponding to each couple of color and depth patches are copied (with possible rotations if required) at the corresponding spatial positions in the color and depth atlases. At the end of the day, one couple of color and depth atlases is produced for every MVD frame of the time period T and one unique list of metadata (including the "basic" and "additional" couples of views properties as well as the patch list properties) is produced for the whole time period T.

Figure 2:
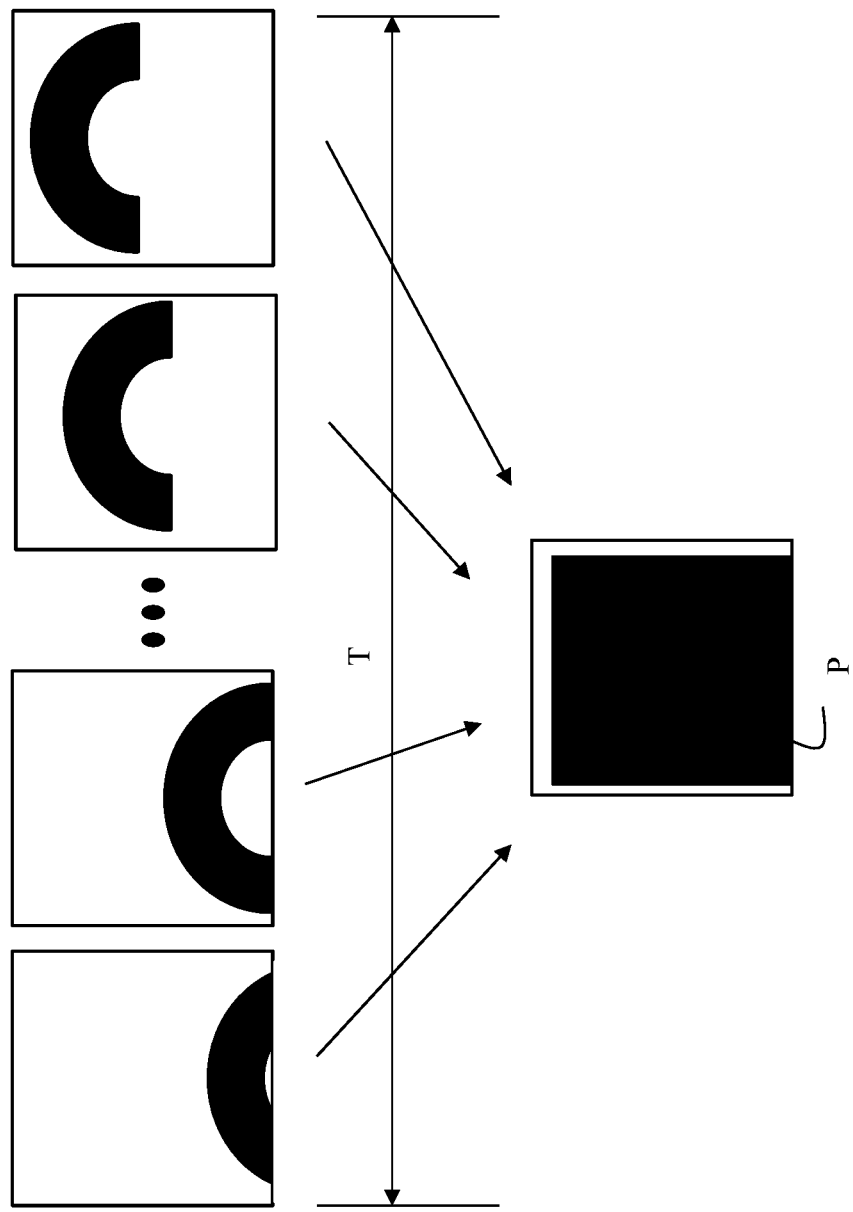
FIG. 2 illustrates an example of patch in accordance with prior art.

One important issue of the atlas constructor happens when important motion occurs in the scene (either due to a moving object or due to camera motion) during the time period T. In that case, the aggregation can produce very large patches resulting from the "sliding motion" of a part of the scene within the patch during the time period T. This is illustrated in FIG. 2 in which a circular shape moves from the bottom to the top of a patch over the time period T. The patch instances (i.e. the patches) are in fact pretty empty (they contain few material) individually but the sliding content induces a part P of the aggregated binary mask that is quasi-complete and thus a "big" cluster ("big" patch) to be packed in the color and depth atlases.

Moreover, trying to take advantage of the sparsity of these patch instances making use of "spatial" patch in patch is not possible in that case since, even if it is empty at a certain time, a given part of the patch instance could be covered during the remaining part of the time period T.

As a straightforward solution, the time period T can be adaptively shorten to reduce the impact of the motion but in that case, the patch instances not impacted by such an issue would be usefully expansive (as shortening the time period implies the addition of an expansive intra-coded MVD frame).

As a consequence, the altas-based volumetric video encoding/decoding of FIG. 1 requires bigger atlases to pack all the scene content when big motions occur which leads to possibly undesirable high pixel rates. A pixel rate is a quantity of pixels to be transmitted per time unit (typically a second) for a video transmission. Usually, a pixel rate is defined by W*H*FPS where W and F are the number of rows and columns of a picture of the video to be transmitted and FPS is a number of frames per time unit. Herein, the pixel rate depends on the size of the color and depth atlas.

Generally speaking, the present embodiments pack a first patch in a second patch for a time interval lower than or equal to the time period T when said first patch can be packed in said second patch over said time interval. The underlying idea is to take advantage of empty areas in the patches to reduce the pixel rate.

Figure 3:
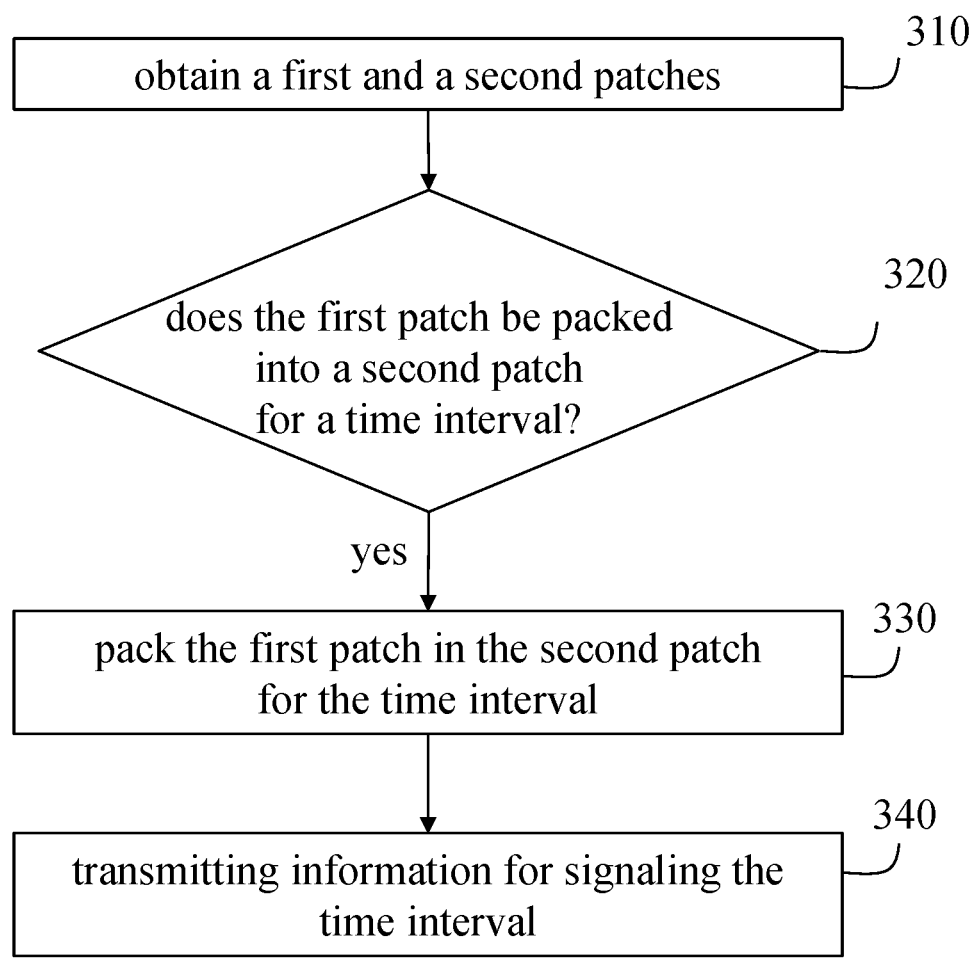
FIG. 3 illustrates a flowchart of the method for encoding volumetric video in accordance with at least one present embodiment.

FIG. 3 illustrates a flowchart of the method for encoding volumetric video in accordance with at least one present embodiment.

In step 310, a first patch and a second patch may be obtained from a color or depth atlas. The second patch is defined over a time period T and the first patch may be defined over a time period that is lower than or equal to the time period T.

Alternatively, the first patch may be a cluster intended to be packed in the color and depth atlases.

In step 320, one checks whether the first patch may be packed in the second patch over a time interval lower than or equal to the time period T.

In step 330, when the first patch can be packed in the second patch over the time interval, the first patch is packed in the second patch over the time interval.

Figure 4:
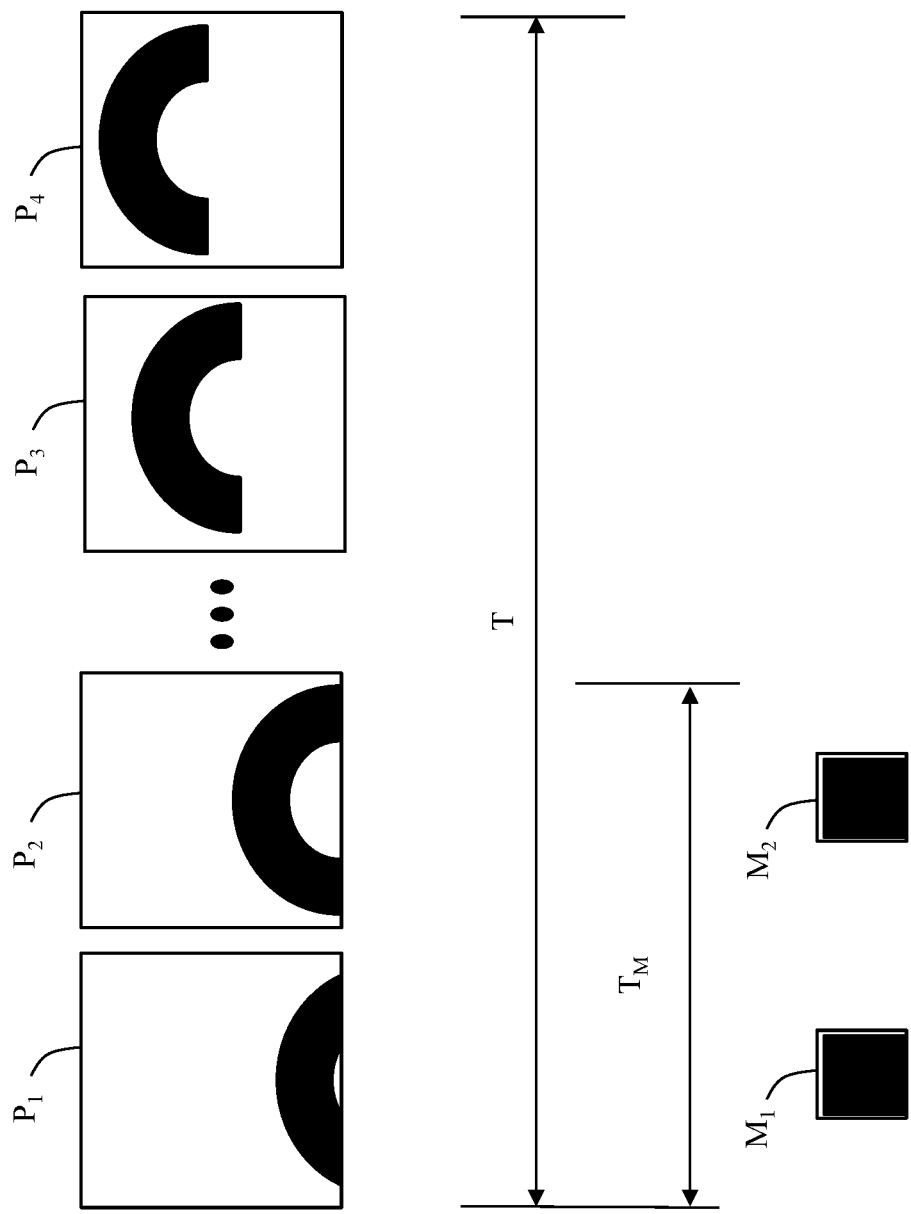
FIG. 4-4d illustrates examples of the method of FIG. 3.
Figure 4A:
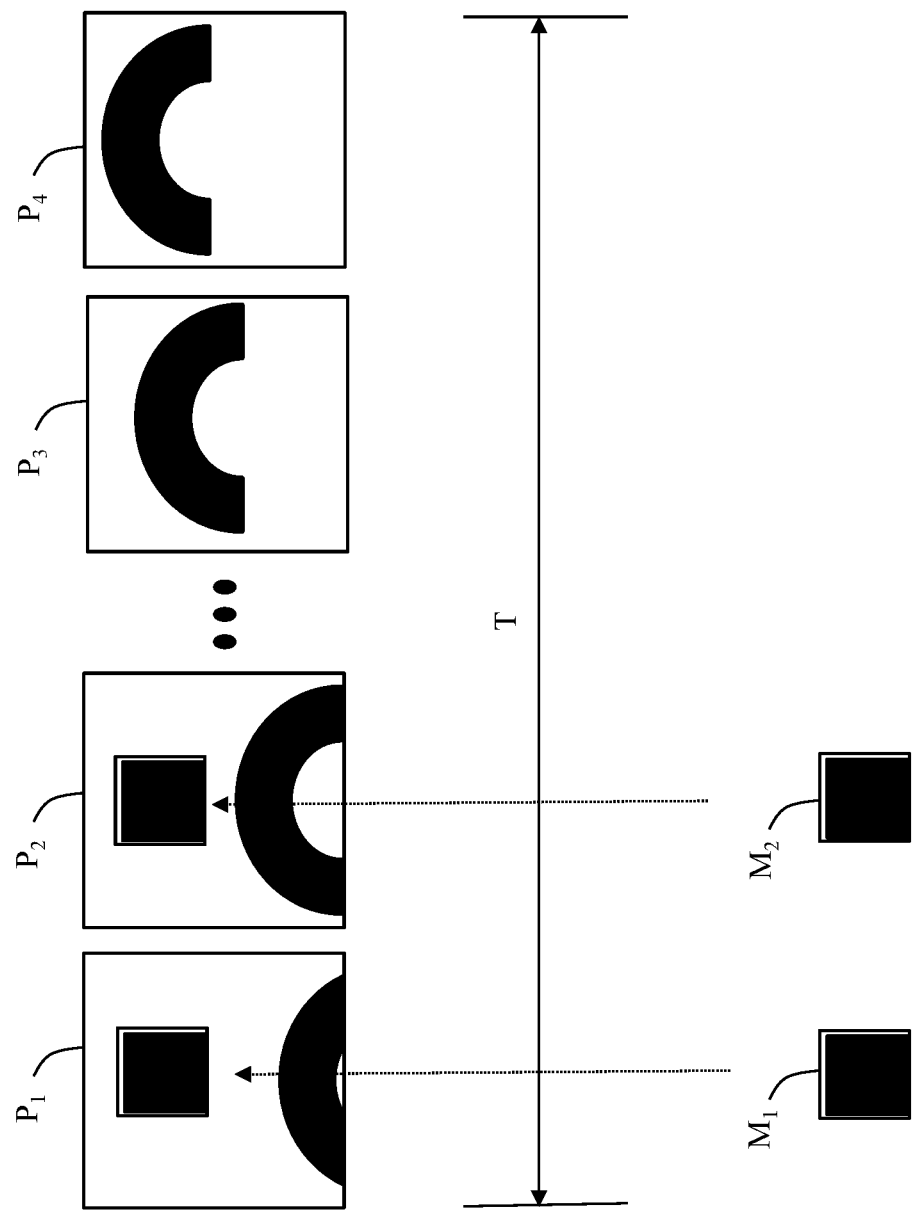

FIG. 4 shows a non-limitative and illustrative example of the method of FIG. 3. Considering a first patch M over a time period $T_M$ and a second patch P over the time period T. Clearly, the patch M may be packed in the patch P because the content of all the instances of the patch M do not overlap the content of instances of the patch P. Herein, the contents of the patch instances $P_1$ and $M_1$, respectively $P_2$ and $M_2$, do not overlap when the patch M is packed in the upper part of the patch M. In other words, the content of all the instances $M_1$ and $M_2$ of the first patch M may be logged (embedded, packed) in empty spaces of patch instances of the second patch, herein $P_1$ and $P_2$ (FIG. 4a).

This illustrative example may be extended to any first and second patches. Also, multiple first patches may also be packed in a same second patch. Moreover, a first patch over a time period may be packed in a second patch over a same time period ($T_M=T$).

Figure 4B:
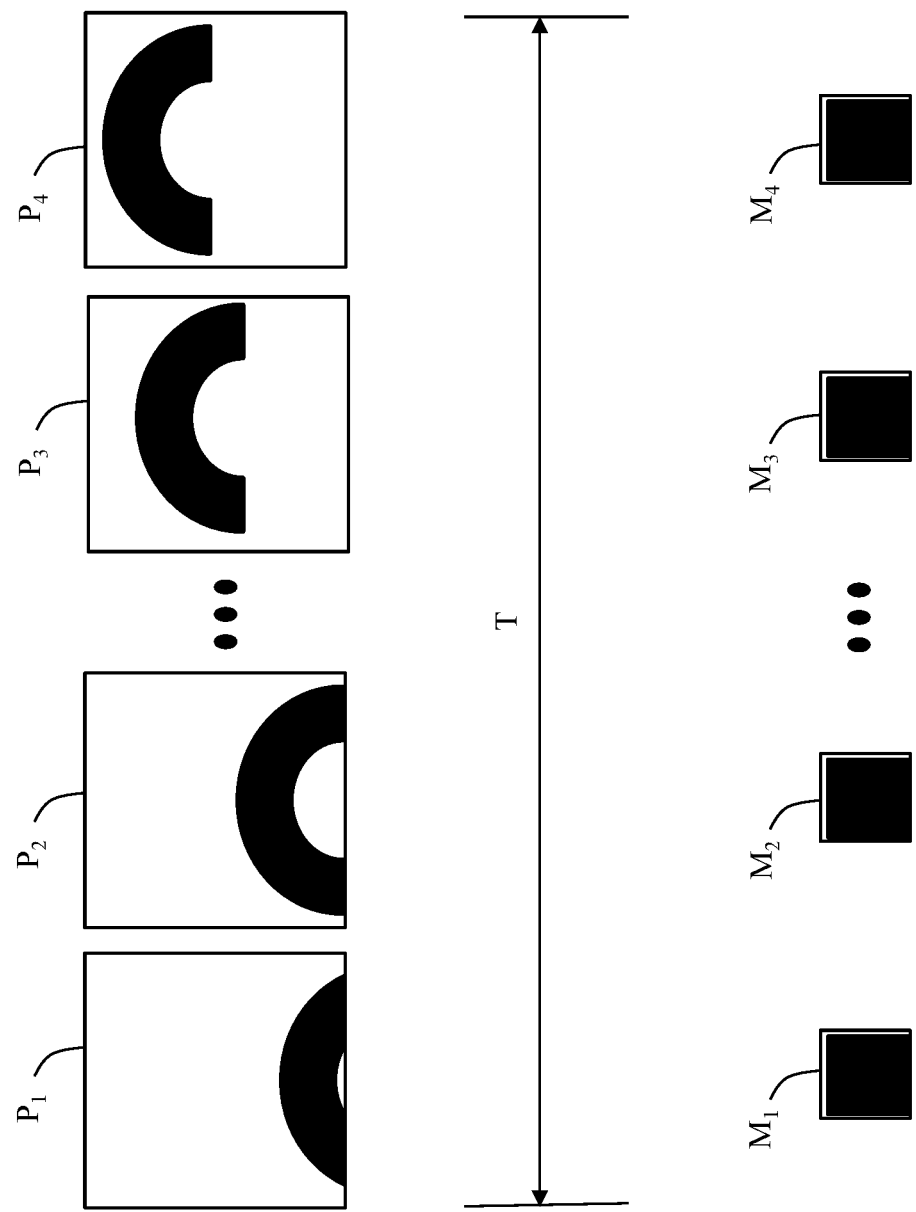

FIG. 4b shows another non-limitative and illustrative example of the method of FIG. 3. Considering a first patch M over the time period T and a second patch P over the time period T. Clearly, the patch M can not be packed in the patch P because if the patch M is packed in the upper part of the patch P, then the content of the patch instances $M_3$ and $M_4$ overlaps the content of patch instances $P_3$ and $P_4$ and if the patch M is packed in the lower part of the patch P, then the content of the patch instances $M_1$ and $M_2$ overlaps the content of the patch instances $P_1$ and $P_2$. In this case, according to the method of FIG. 3, two first patches N and O are obtained (FIG. 4c) from the patch M (FIG. 4b). The first patch N is defined over a time interval $T_1$ lower than the time period T and the first patch O is defined over a time interval $T_2$ lower than the time period T. Clearly, the patch N may be packed in the upper part of the patch P because the content of all the instances of the patch N do not overlap the content of instances of the patch P. Herein, the contents of the patch instances $P_1$ and $N_1$, respectively $P_2$ and $N_2$, do not overlap. Also, the patch O may be packed in the lower part of the patch P because the content of all the instances of the patch O do not overlap the content of instances of the patch P. Herein, the contents of the patch instances $P_3$ and $O_1$, respectively $P_4$ and $O_2$, do not overlap.

In one embodiment, a time interval (T1, T2, . . . ) may be defined in order to minimize the number of time intervals required for packing a patch (M) in a second patch (P).

Figure 4C:
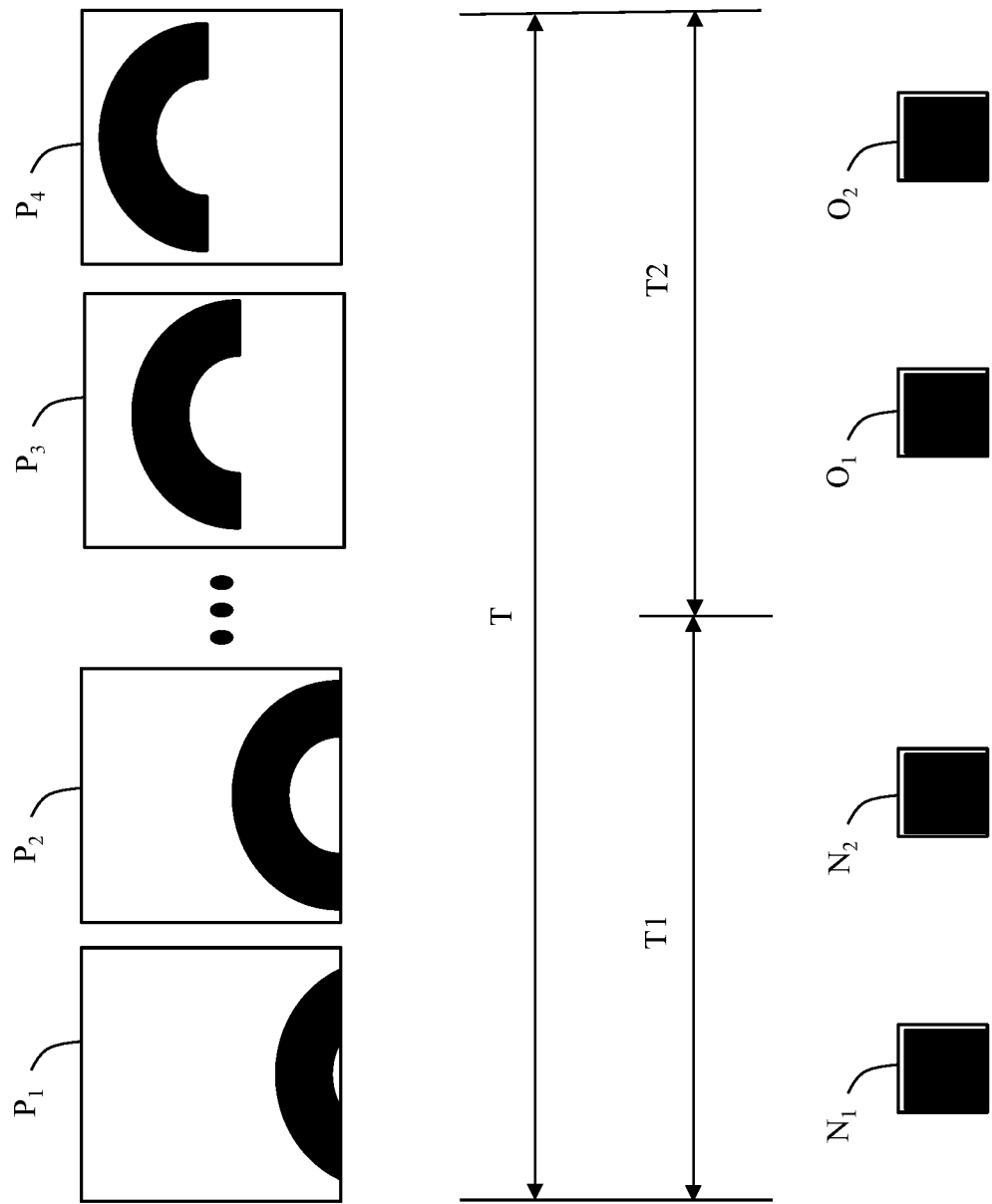

In variant, a time interval is defined by regularly splitting the time period T. In the example of FIG. 4c, the time period T is split into two identical time intervals T1 and T2 but any other value is allowed.

Figure 4D:
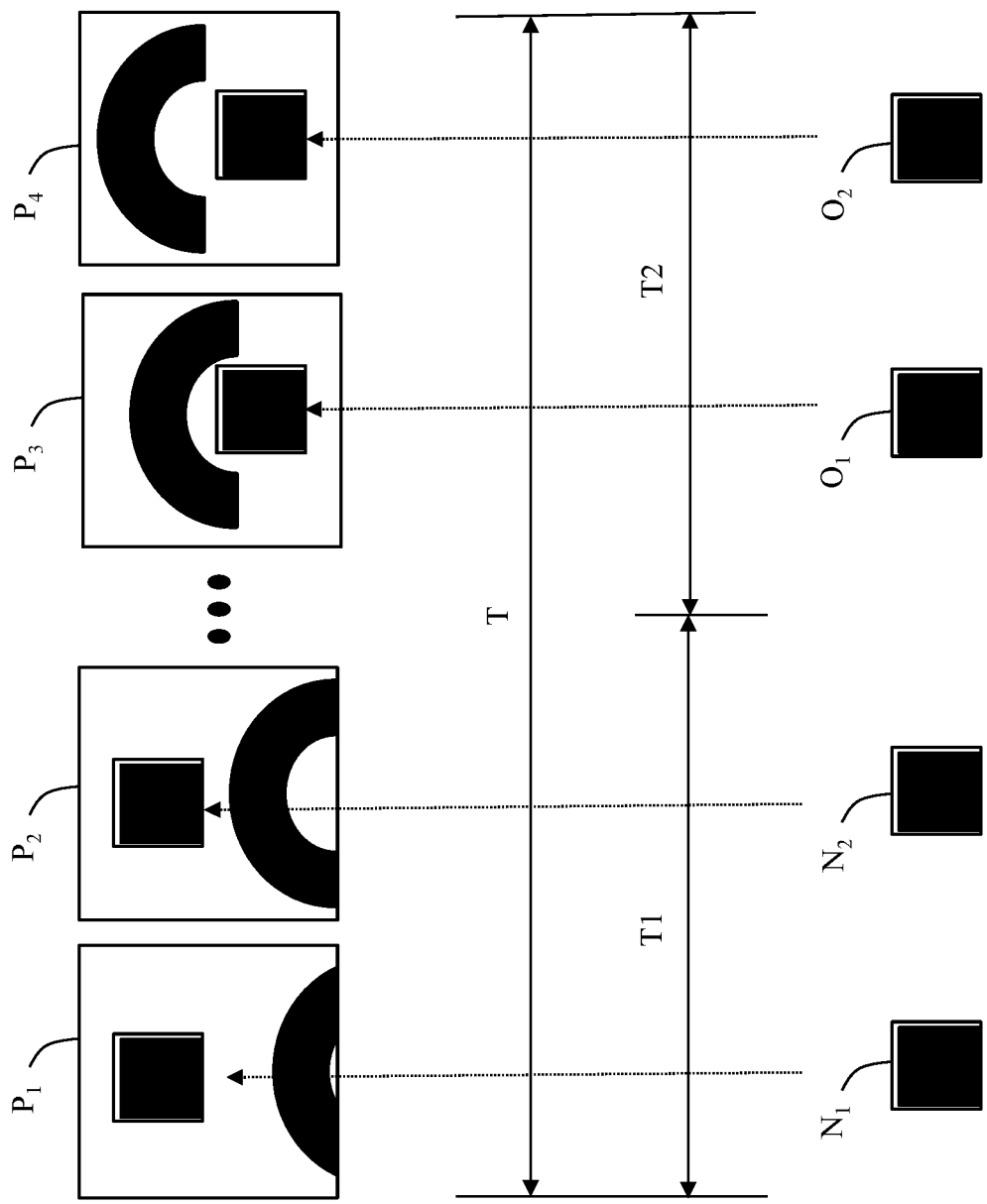

Clearly, the patch N (FIG. 4c) may be packed in the upper part of the patch P because the contents of the patch instances $N_1$ and $P_1$, respectively $N_2$ and $P_2$, do not overlap. The patch O may also be packed in the lower part of the patch P because the contents of the patch instances $O_1$ and $P_3$, respectively $O_2$ and $P_4$, do not overlap (FIG. 4d).

Figure 3A:
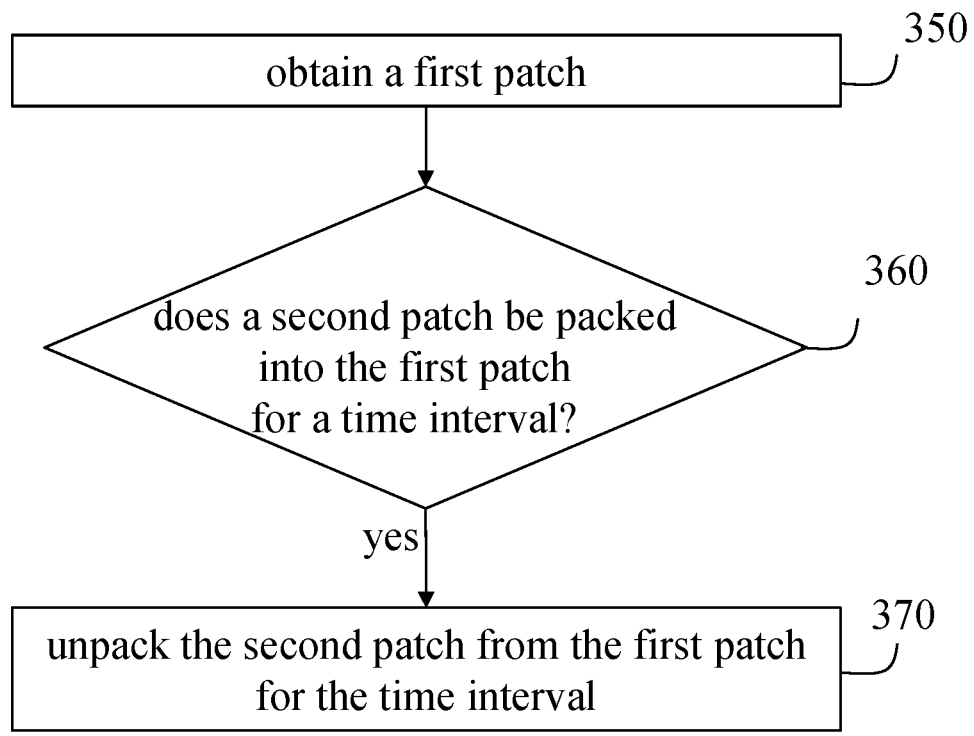
FIG. 3a illustrates a flowchart of the method for decoding volumetric video in accordance with at least one present embodiment.

FIG. 3a illustrates a flowchart of the method for decoding volumetric video in accordance with at least one present embodiment.

In step 350, a second patch over a time period T may be obtained from a color or depth atlas.

In step 360, one checks whether a first patch is packed in the second patch over a time interval lower than or equal to the time period T.

In step 370, when a first patch is packed in the second patch over the time interval, the first patch is unpacked from the second patch over said time interval.

In a variant of the methods of FIGS. 3 and 3a, an information INF defining the time interval is signaled, that is transmitted by a coder and received by a decoder, possibly from a bitstream.

Then, the method of FIG. 3 comprises a step 340 of transmitting the information INF and in one embodiment of step 360, a first patch is said packed in a second patch over a time interval when an information defining said time interval is received, possibly from a bitstream.

In one embodiment, said signaled information INF indicates a first and a second indices of an ordered list of patches.

For example, a field of 4 bits could be considered to store each of these indices in the case of a 32-length time period.

In an embodiment, the time period being split into multiple time intervals, said signaled information INF is a bit indicating one of said time intervals.

For example, the time period T may be split into N regular tim intervals (for example 4 time intervals of 8 frames for a 32-length time period T) and the signaled information may a field of N bits. A ith bit is set to 1 if the patch "exists" during the ith time interval of the time period T.

FIG. 5 illustrates an example of a syntax element "altas_params" relative to parameters of a color and depth atlas that comprises a syntax element "patch-lifetime" representative of said signaled information INF. The index "a" may refer to a patch index and the index "i" may refer to a time interval index.

Figure 6:
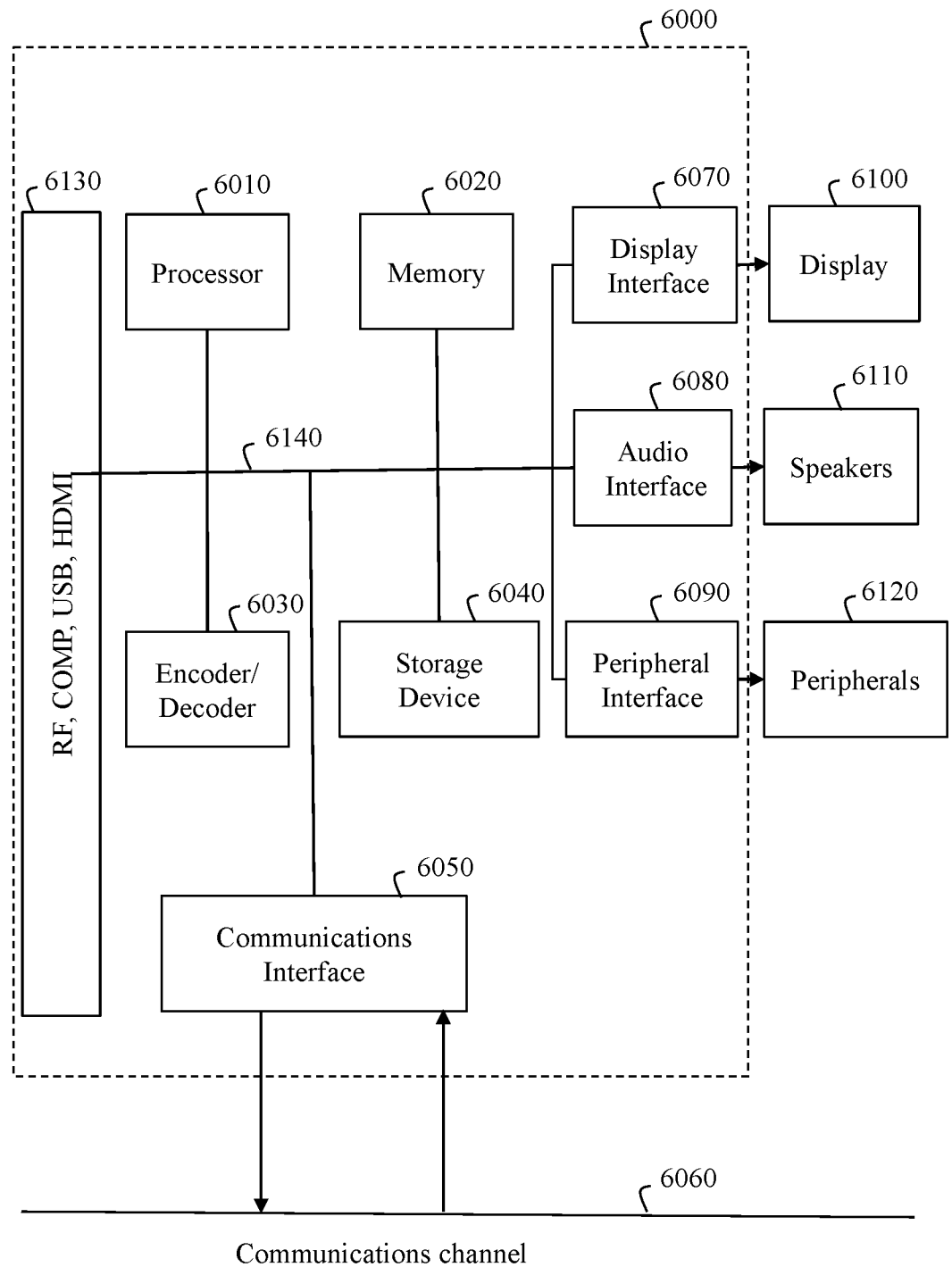
FIG. 6 illustrates a schematic block diagram of an example of a system in which various aspects and embodiments are implemented.

FIG. 6 shows a schematic block diagram illustrating an example of a system in which various aspects and embodiments are implemented.

System 6000 may be embodied as one or more devices including the various components described below and is configured to perform one or more of the aspects described in this document. Examples of equipment that may form all or part of the system 6000 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 6000, singly or in combination, may be embodied in a single integrated circuit, multiple ICs, and/or discrete components. For example, in at least one embodiment, the processing and encoder/decoder elements of system 6000 may be distributed across multiple ICs and/or discrete components. In various embodiments, the system 6000 may be communicatively coupled to other similar systems, or to other electronic devices, via, for example, a communications bus or through dedicated input and/or output ports. In various embodiments, the system 6000 may be configured to implement one or more of the aspects described in this document.

The system 6000 may include at least one processor 6010 configured to execute instructions loaded therein for implementing, for example, the various aspects described in this document. Processor 6010 may include embedded memory, input output interface, and various other circuitries as known in the art. The system 6000 may include at least one memory 6020 (for example a volatile memory device and/or a non-volatile memory device). System 6000 may include a storage device 6040, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 6040 may include an internal storage device, an attached storage device, and/or a network accessible storage device, as non-limiting examples.

The system 6000 may include an encoder/decoder module 6030 configured, for example, to process data to provide encoded data or decoded data, and the encoder/decoder module 6030 may include its own processor and memory. The encoder/decoder module 6030 may represent module(s) that may be included in a device to perform the encoding and/or decoding functions. As is known, a device may include one or both of the encoding and decoding modules. Additionally, encoder/decoder module 6030 may be implemented as a separate element of system 6000 or may be incorporated within processor 6010 as a combination of hardware and software as known to those skilled in the art.

Program code to be loaded onto processor 6010 or encoder/decoder 6030 to perform the various aspects described in this document may be stored in storage device 6040 and subsequently loaded onto memory 6020 for execution by processor 6010. In accordance with various embodiments, one or more of processor 6010, memory 6020, storage device 6040, and encoder/decoder module 6030 may store one or more of various items during the performance of the processes described in this document. Such stored items may include, but are not limited to, a point cloud frame, encoded/decoded geometry/texture videos/images or portions of the encoded/decoded geometry/texture video/images, a bitstream, matrices, variables, and intermediate or final results from the processing of equations, formulas, operations, and operational logic.

In several embodiments, memory inside of the processor 6010 and/or the encoder/decoder module 6030 may be used to store instructions and to provide working memory for processing that may be performed during encoding or decoding.

In other embodiments, however, a memory external to the processing device (for example, the processing device may be either the processor 6010 or the encoder/decoder module 6030) may be used for one or more of these functions. The external memory may be the memory 6020 and/or the storage device 6040, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), or VVC (Versatile Video Coding).

The input to the elements of system 6000 may be provided through various input devices as indicated in block 6130. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 6130 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 6000 to other electronic devices across USB and/or HDMI connections. It is to be understood that various aspects of input processing, for example, Reed-Solomon error correction, may be implemented, for example, within a separate input processing IC or within processor 6010 as necessary. Similarly, aspects of USB or HDMI interface processing may be implemented within separate interface ICs or within processor 6010 as necessary. The demodulated, error corrected, and demultiplexed stream may be provided to various processing elements, including, for example, processor 6010, and encoder/decoder 6030 operating in combination with the memory and storage elements to process the data stream as necessary for presentation on an output device.

Various elements of system 6000 may be provided within an integrated housing. Within the integrated housing, the various elements may be interconnected and transmit data therebetween using suitable connection arrangement 6140, for example, an internal bus as known in the art, including the I2C bus, wiring, and printed circuit boards.

The system 6000 may include communication interface 6050 that enables communication with other devices via communication channel 6060. The communication interface 6050 may include, but is not limited to, a transceiver configured to transmit and to receive data over communication channel 6060. The communication interface 6050 may include, but is not limited to, a modem or network card and the communication channel 6060 may be implemented, for example, within a wired and/or a wireless medium.

Data may be streamed to the system 6000, in various embodiments, using a Wi-Fi network such as IEEE 802.11. The Wi-Fi signal of these embodiments may be received over the communications channel 6060 and the communications interface 6050 which are adapted for Wi-Fi communications. The communications channel 6060 of these embodiments may be typically connected to an access point or router that provides access to outside networks including the Internet for allowing streaming applications and other over-the-top communications.

Other embodiments may provide streamed data to the system 6000 using a set-top box that delivers the data over the HDMI connection of the input block 6130.

Still other embodiments may provide streamed data to the system 6000 using the RF connection of the input block 6130.

It is to be appreciated that signaling may be accomplished in a variety of ways. For example, one or more syntax elements, flags, and so forth may be used to signal information to a corresponding decoder in various embodiments.

The system 6000 may provide an output signal to various output devices, including a display 6100, speakers 6110, and other peripheral devices 6120. The other peripheral devices 6120 may include, in various examples of embodiments, one or more of a stand-alone DVR, a disk player, a stereo system, a lighting system, and other devices that provide a function based on the output of the system 3000.

In various embodiments, control signals may be communicated between the system 6000 and the display 6100, speakers 6110, or other peripheral devices 6120 using signaling such as AV.Link (Audio/Video Link), CEC (Consumer Electronics Control), or other communications protocols that enable device-to-device control with or without user intervention.

The output devices may be communicatively coupled to system 6000 via dedicated connections through respective interfaces 6070, 6080, and 6090.

Alternatively, the output devices may be connected to system 6000 using the communications channel 6060 via the communications interface 6050. The display 6100 and speakers 6110 may be integrated in a single unit with the other components of system 6000 in an electronic device such as, for example, a television.

In various embodiments, the display interface 6070 may include a display driver, such as, for example, a timing controller (T Con) chip.

The display 6100 and speaker 6110 may alternatively be separate from one or more of the other components, for example, if the RF portion of input 6130 is part of a separate set-top box. In various embodiments in which the display 6100 and speakers 6110 may be external components, the output signal may be provided via dedicated output connections, including, for example, HDMI ports, USB ports, or COMP outputs.

In FIG. 1-6, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 6010 or by hardware, or by a combination of hardware and software. As a non-limiting example, the embodiments may be also implemented by one or more integrated circuits. The memory 6020 may be of any type appropriate to the technical environment and may be implemented using any appropriate data storage technology, such as optical memory devices, magnetic memory devices, semiconductor-based memory devices, fixed memory, and removable memory, as non-limiting examples. The processor 6010 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the present application. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure, is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by an image-based decoder.

As further examples, in one embodiment "decoding" may refer only to entropy decoding, in another embodiment "decoding" may refer only to differential decoding, and in another embodiment "decoding" may refer to a combination of entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an image-based decoder.

As further examples, in one embodiment "encoding" may refer only to entropy encoding, in another embodiment "encoding" may refer only to differential encoding, and in another embodiment "encoding" may refer to a combination of differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

Various embodiments refer to rate distortion optimization. In particular, during the encoding process, the balance or trade-off between the rate and distortion is usually considered, often given the constraints of computational complexity. The rate distortion optimization may be usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. A mix of these two approaches may also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information. Also, as used herein, the word "signal" refers to, among other things, indicating something to a corresponding decoder. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method, comprising:
encoding a volumetric video representing a scene, said encoding being based on patches representing at least one of a color or depth of a 2D projection of subparts of the scene over a period of time, wherein a first patch is packed in a second patch for a given time interval lower than or equal to a time period along which the second patch is defined when a content of all instances of the first patch do not overlap a content of any instance of the second patch over said time period; and
transmitting information defining said time interval.

2. A method, comprising:
receiving information defining a time interval;
decoding a volumetric video representing a scene, said decoding being based on patches representing at least one of a color or depth of a 2D projection of subparts of the scene over a period of time, wherein when a first patch is packed in a second patch for said time interval lower than or equal to a time period along which the second patch is defined; and
unpacking said first patch from said second patch over said time interval.

3. An apparatus, comprising:
electronic circuitry configured for:
encoding a volumetric video representing a scene, said encoding being based on patches representing at least one of a color or depth of a 2D projection of subparts of the scene over a period of time, wherein a first patch is packed in a second patch for a given time interval lower than or equal to a time period along which the second patch is defined when a content of all instances of the first patch do not overlap a content of any instance of the second patch over said time period; and
transmitting information defining said time interval.

4. An apparatus, comprising:
electronic circuitry configured for:
receiving information defining a time interval;
decoding a volumetric video representing a scene, said decoding being based on patches representing at least one of a color or depth of a 2D projection of subparts of the scene over a period of time, wherein when a first patch is packed in a second patch for said time interval lower than or equal to a time period along which the second patch is defined; and
unpacking said first patch from said second patch over said time interval.

5. The method of claim 2, wherein said information indicates first and second indices of an ordered list of patches.

6. The method of claim 1, wherein the time period is split into multiple time intervals, and wherein said information defining said time interval is a bit indicating one of said multiple time intervals.

7. A non-transitory computer-readable storage medium including instructions for causing one or more processors to perform:
encoding a volumetric video representing a scene, said encoding being based on patches representing at least one of a color or depth of a 2D projection of subparts of the scene over a period of time, wherein a first patch is packed in a second patch for a given time interval lower than or equal to a time period along which the second patch is defined when a content of all instances of the first patch do not overlap a content of any instance of the second patch over said time period; and
transmitting information defining said time interval.

8. A non-transitory computer-readable storage medium including instructions for causing one or more processors to perform:
receiving information defining a time interval;
decoding a volumetric video representing a scene, said decoding being based on patches representing at least one of a color or depth of a 2D projection of subparts of the scene over a period of time, wherein when a first patch is packed in a second patch for said time interval lower than or equal to a time period along which the second patch is defined; and
unpacking said first patch from said second patch over said time interval.

9. The method of claim 2, wherein said information indicates first and second indices of an ordered list of patches.

10. The method of claim 2, wherein the time period is split into multiple time intervals, and wherein said information defining said time interval is a bit indicating one of said multiple time intervals.

11. The apparatus of claim 3, wherein said information indicates first and second indices of an ordered list of patches.

12. The apparatus of claim 3, wherein the time period is split into multiple time intervals, and wherein said information defining said time interval is a bit indicating one of said multiple time intervals.

13. The apparatus of claim 4, wherein said information indicates first and second indices of an ordered list of patches.

14. The apparatus of claim 4, wherein the time period is split into multiple time intervals, and wherein said information defining said time interval is a bit indicating one of said multiple time intervals.

* * * * *